United States Patent [19]

Mason

[11] Patent Number: 4,846,493

[45] Date of Patent: Jul. 11, 1989

[54] PORTABLE COOLER WITH RETRACTABLE WHEELS

[76] Inventor: Donald W. Mason, 342 Daisy Trail, Antioch, Tenn. 37023

[21] Appl. No.: 112,516

[22] Filed: Oct. 26, 1987

[51] Int. Cl.$^4$ .............................................. B62B 1/12
[52] U.S. Cl. .................................. 280/641; 190/18 A; 280/38; 280/43.1; 280/43.24; 280/47.21; 280/645; 280/655
[58] Field of Search ................... 280/37, 38, 641, 645, 280/43.1, 43.24, 47.21, 47.22, 655, 30, 31, 33.99 B; 190/18 A

[56] References Cited

U.S. PATENT DOCUMENTS

| | | | |
|---|---|---|---|
| 172,101 | 5/1854 | Long | 14/3 |
| 177,179 | 3/1856 | Hodgman | 14/3 |
| 1,715,865 | 6/1929 | Rosenfeld | 280/37 |
| 2,392,926 | 1/1946 | Kelly | 190/18 A |
| 2,439,660 | 4/1948 | Keil | 280/38 |
| 2,472,491 | 6/1949 | Quinton | 280/38 |
| 2,510,754 | 6/1950 | Norlin | 190/18 A |
| 2,603,500 | 7/1952 | Messier | 280/30 |
| 2,883,731 | 4/1959 | Wells | 280/47 |
| 3,266,482 | 8/1966 | Scavullo | 126/275 |
| 3,580,533 | 5/1971 | Nordland | 248/96 |
| 3,591,194 | 7/1971 | Vega | 280/47 |
| 4,164,853 | 8/1979 | McDonough | 62/457 |
| 4,460,188 | 7/1984 | Maloff | 280/30 |
| 4,724,681 | 2/1988 | Bartholomew et al. | 190/18 A |

*Primary Examiner*—Charles A. Marmor
*Assistant Examiner*—Eric Culbreth
*Attorney, Agent, or Firm*—Zarley, McKee, Thomte, Voorhees & Sease

[57] ABSTRACT

A portable cooler includes a pair of wheels which are retractable into a pair of recesses in the main body of the cooler. The wheels pivot on frames which are connected by a horizontally-oriented rod, the rod being lockable in hook members in a retracted position and in an operable position. An extendable handle is attached to the forward end of the cooler to pull the cooler along the ground on its wheels.

6 Claims, 2 Drawing Sheets

PORTABLE COOLER WITH RETRACTABLE WHEELS

TECHNICAL FIELD

The present invention relates generally to portable coolers, and more specifically to coolers having wheels for ease in moving the cooler over distances.

BACKGROUND OF THE INVENTION

While there are a wide variety of styles and sizes of ice chests or coolers on the market today, the larger coolers still suffer from being difficult to carry over distances. This is especially true where the cooler is being carried up hills or the like for a picnic. Thus, the size of the cooler used for a picnic was limited to that which could be easily transported in the vehicle and then carried to the picnic site. While a larger cooler could carry more food and related items, it could not be easily carried from the vehicle for any great distance.

One attempt to solve this problem is disclosed in U.S. Pat. No. 3,591,194 to Philip Vega, wherein an ice chest was outfitted with a pair of wheels affixed to the bottom, and a handle was connected to the side to push the wheeled cooler. While the ice chest of that patent is certainly more easily moved along the ground to the picnic site than a cooler without wheels, it is much less convenient to fit into a vehicle. The handle and wheels project outwardly so as to interfere and cause problems in arranging such an ice chest in the vehicle.

It is therefore a general object of the present invention to provide an improved cooler having retractable wheels.

Another object is to provide a cooler with wheels which do not project beyond the cooler housing when in a retracted position.

A further object of the present invention is to provide a cooler with wheels that may be extended to an operable position and which also retract within the cooler housing for storage.

Another object is to provide a cooler that is economic to manufacture, simple to operate, and refined in appearance.

These and other objects will be apparent to those skilled in the art.

SUMMARY OF THE INVENTION

The portable cooler of this invention includes a pair of wheels which are retractable into a pair of recesses in the main body of the cooler. The recesses allow the wheels to be retracted within the general confines of the cooler body, such that the cooler takes up no greater space than a cooler without wheels. The wheels pivot on frames which are connected together by a horizontally-oriented rod. The rod may be moved vertically along the rearward end of the cooler to pivot the wheels between the operable and retracted positions. A pair of lower and upper hook members are mounted on the rearward end of the cooler to hold the rod, and thus the wheels, in the operable and retracted positions. An extendable handle is attached to the forward end of the cooler to allow easy pulling of the cooler on its wheels.

DESCRIPTION OF THE PREFERRED EMBODIMENT

Figure 1:
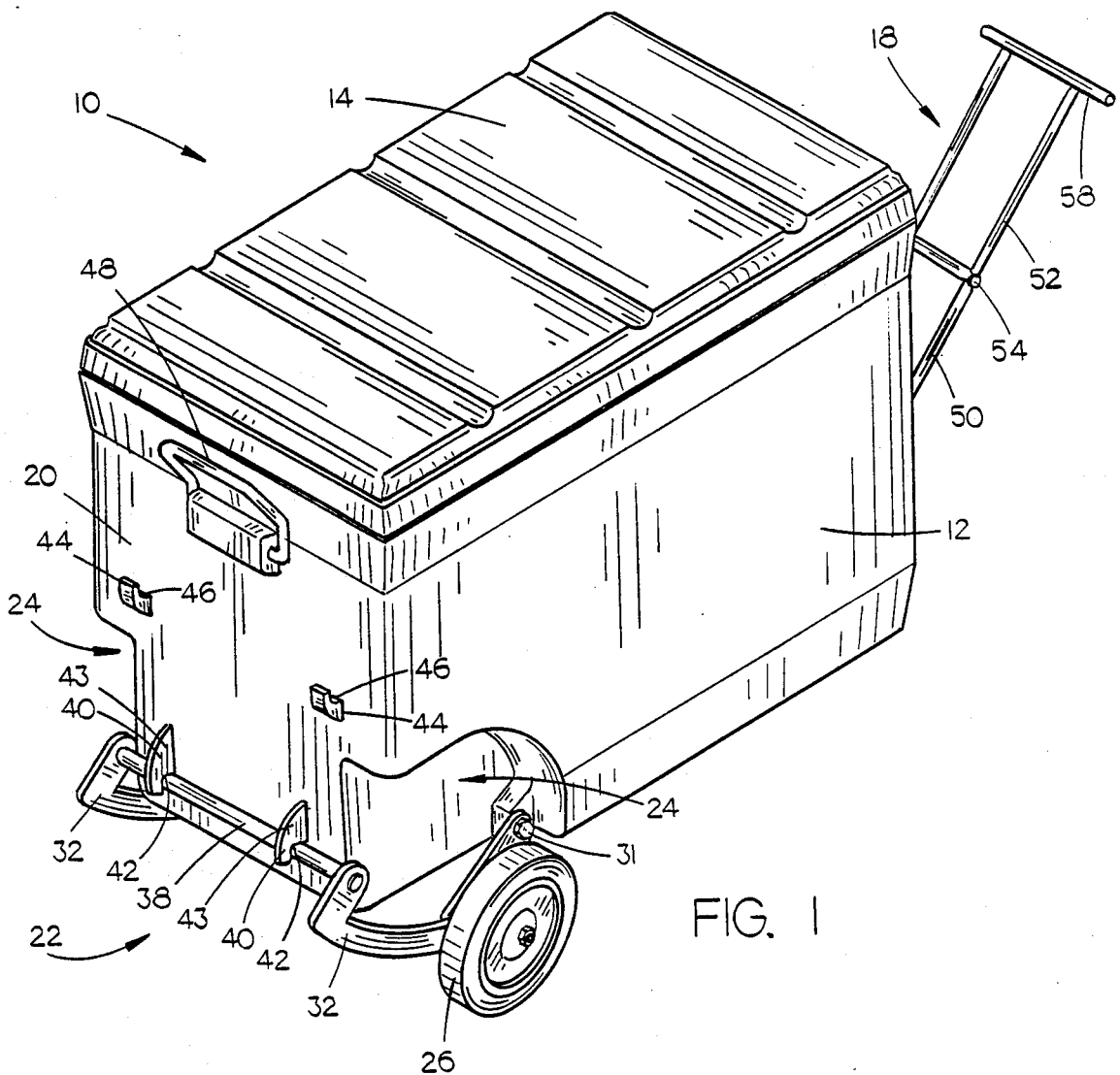
FIG. 1 is a perspective view of the invention showing the rearward end and one side of the cooler.
Figure 2:
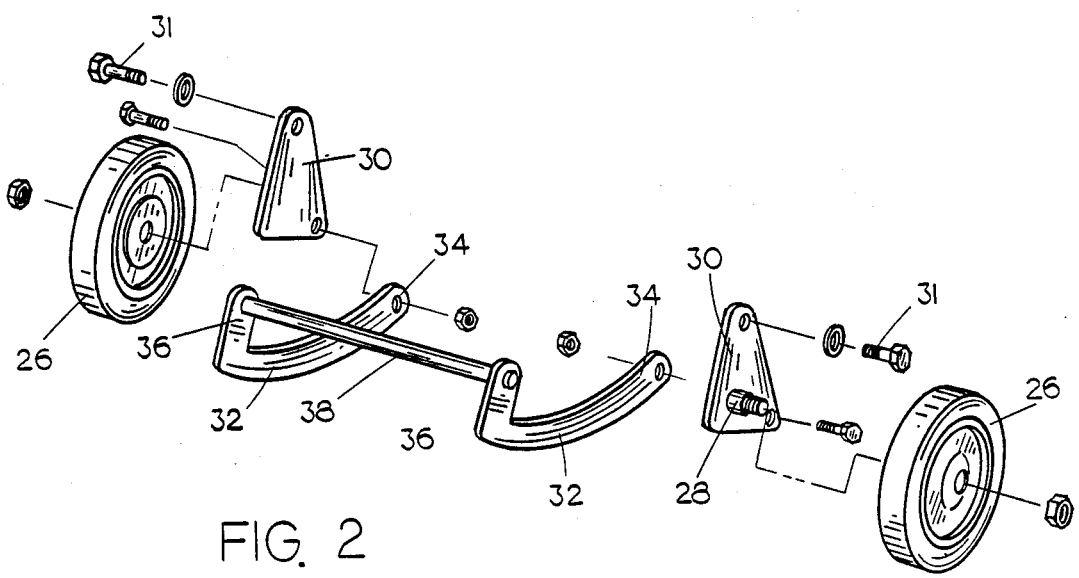
FIG. 2 is an exploded perspective view of the retractable wheel assembly of the invention.
Figure 3:
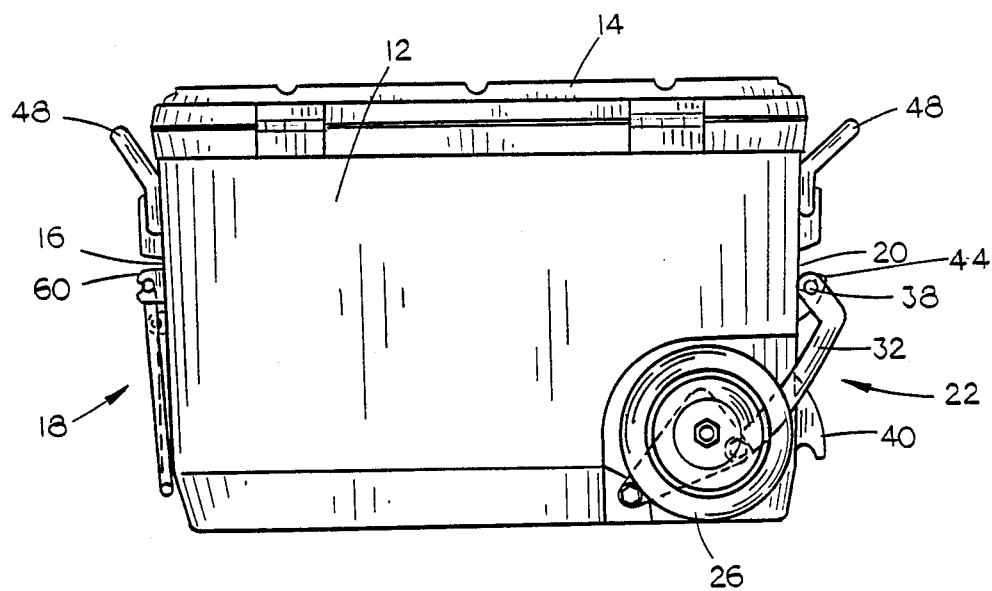
FIG. 3 is a side view of the invention showing the wheels in the retracted position.
Figure 4:
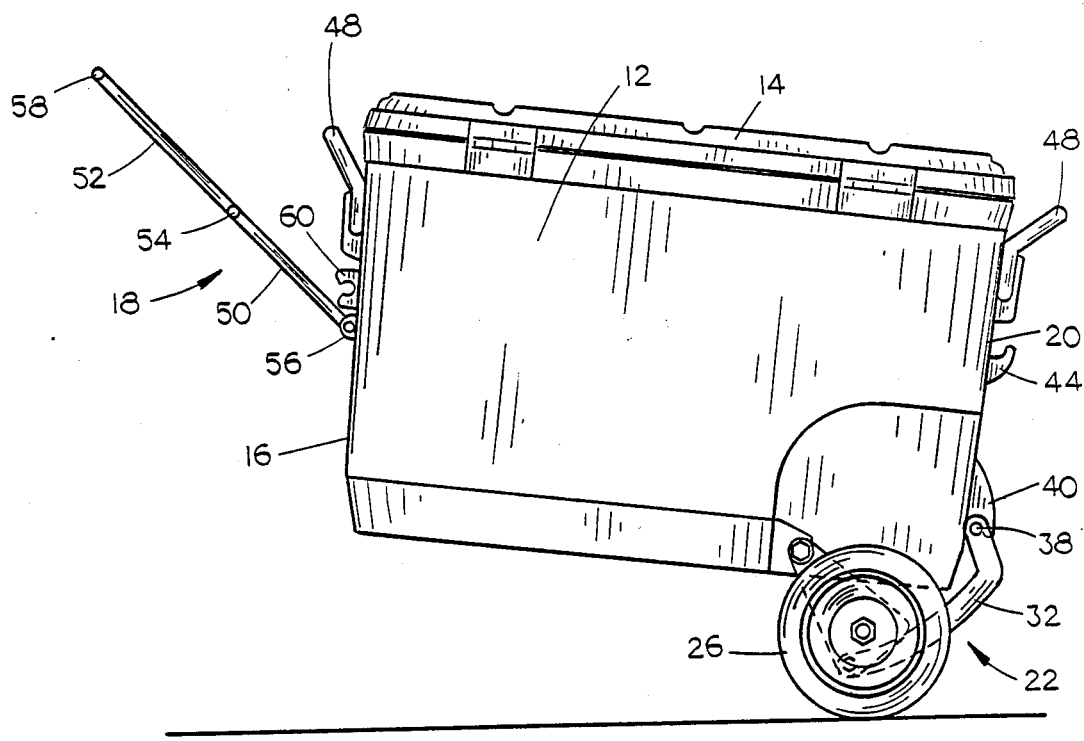
FIG. 4 is a side view showing the wheels in the lowered, operable position.

Referring now to the drawings, in which similar or corresponding parts are identified with the same reference numeral, the cooler of this invention is designated generally at 10 and includes a main body 12 with a lid 14. Main body 12 has a forward end 16 upon which an extendable towing handle 18 is mounted, and a rearward end 20 which has a retractable wheel assembly 22 mounted thereon. A pair of wheel recesses 24 are formed in the lower corners of the rearward end 20 into which wheels 26 may be retracted on wheel assembly 22.

Wheel assembly 22 includes a pair of wheels 26, each being rotatably mounted on a short axle 28 which projects from a pivotal plate 30. Wheels 26 may be pneumatic, hard rubber, or of other material, but should be large enough to easily travel across sand and various types of ground.

Plate 30 is mounted at its forward end for vertical pivotal movement within recess 24. A bolt 31 or similar pivotal bearing is utilized to mount plate 30 to the main body 12. Plate 30 has its pivotal axis located at the lower portion of the forward end of the recess, as seen in the drawings. Short axle 28 is located at an intermediate point on plate 30 such that wheel 26 will be pivoted upwardly into the confines of recess 24 when assembly 22 is moved into an upper "retracted" position.

A rigid arm 32 is pivotally connected at its lower end to the rearward end of plate 30, and serves to pivot plate 30 and wheels 26 from an "operable" position to the retracted position. The upper ends 36 of arms 32 are connected to opposing ends of a horizontally-oriented locking rod 38.

A pair of lower hook-like members 40 are mounted spaced apart along the lower edge of the rearward end 20 of main body 12. Lower hook members 40 have a hook portion 42 directed downwardly, and an upper portion 43 tapering upwardly from hook portion 42. Hook portion 42 will receive rod 38 and hold it in position as the cooler 10 is pulled along the ground.

A pair of upper hook-like members 44 are mounted spaced apart along the rearward end 20 of the main body 12, and are located slightly above the top of recesses 24 and above lower hook members 40. Upper hook members 44 have a hook portion 46 directed upwardly, which will receive rod 38 and hold it in position. The upper position of rod 38 maintains wheels 26 in their retracted position, the weight of wheels 26 and assembly 22 holding rod 38 in upper hook members 44.

The conventional handles 48 on each end of cooler 10 do not extend to a height which allows the user to pull cooler 10 on its wheels 26 without stooping. An extendable handle 18 has been added at the forward end 16 in order to more easily pull cooler 10.

Handle 18 includes a pair of legs 50 and 52 connected at hinge 54 so as to fold together. One leg 50 is pivotally connected to bearings 56 on the forward end 16 of main body 12, as seen in the drawings. A cylindrical grip 58 is affixed to the free end of leg 52, and permits the user to grasp the extendable handle 18. Handle 18 has dimensions such that it will fold against the forward end 16 of the body 12 with grip 58 below conventional handle 48. Grip 58 may then be snapped into ears 60 mounted below conventional handle 48.

In order to lower wheels 26 so that cooler 10 may be pulled, the rearward end 20 of cooler 10 is lifted using conventional handle 48. Lock rod 38 is then lifted out of upper hook members 44 and lowered and hooked under lower hook members 40. The reearward end of the cooler is then lowered onto wheels 26.

It can therefore be seen that the cooler of this invention may be easily pulled along the ground with its wheels in an operable position. The use of wheels which retract into recesses in the cooler body greatly enhances the ease of transporting the cooler in a vehicle, since the wheels will retract within the confines of the cooler body. It is therefore believed that the cooler of this invention fulfills at least all of the above described objectives.

I claim:

1. A portable cooler, comprising:
   a hollow, main body having forward and rearward ends and an open top;
   a lid for selectively closing said open top;
   a recess in each corner of the lower rearward end of said cooler for receiving a wheel;
   a pair of wheels, each rotatably mounted on a frame connected to said body, each said frame pivotally connected to said body for pivoting said wheels means between a lower operable position and an upper retracted position;
   a horizontally-oriented rod connected between said frame means and vertically movable along the rearward end of said body so as to simultaneously pivot both said frame means between said operable and retracted positions;
   means for selectively locking said wheels in said operable position, including first rod-holding means mounted on the lower end of said rearward end of the main body for holding said rod and wheels in said operable position;
   means for selectively locking said wheels in said retracted position including second rod-holding means mounted above said first rod-holding means and adapted to hold said rod and wheels in said retracted position;
   means connected to said cooler for pulling the same when the wheels are in the operable position.

2. The cooler of claim 1, wherein each said frame is connected to said body within each said recess.

3. The cooler of claim 1, wherein said means for pulling the cooler is mounted to the forward end thereof.

4. The cooler of claim 1, wherein said recesses have greater dimensions than said wheels such that said wheels will retract completely therein, such that when the wheels are retracted the cooler may be stored within the same space as a conventional cooler without such wheels.

5. The cooler of claim 1 wherein each said frame includes a vertically oriented plate means, said plate means having a forward end, a rearward end and an outwardly facing surface, said plate means pivotally mounted at its forward end for pivoting within a vertical plane, each said plate means having one of said wheels rotatably mounted on the outward surface intermediate the ends thereof.

6. The cooler of claim 1, wherein said first rod-holding means includes first hook member means with a downwardly directed hook portion for receiving said rod and wherein said second rod-holding means includes second hook member means with an upwardly directed hook portion for receiving said rod.

* * * * *